(12) United States Patent
Hoffmann

(10) Patent No.: US 6,172,992 B1
(45) Date of Patent: Jan. 9, 2001

(54) MEASURING DEVICE FOR THE INTERFACE OF A TRANSMISSION LINK WITH FULL-DUPLEX TRANSMISSION IN TWO-WIRE COMMON BAND OPERATION

(75) Inventor: Klaus Hoffmann, Munich (DE)

(73) Assignee: Tektronix, Inc., Beaverton, OR (US)

( * ) Notice: Under 35 U.S.C. 154(b), the term of this patent shall be extended for 0 days.

(21) Appl. No.: 08/979,090

(22) Filed: Nov. 26, 1997

(30) Foreign Application Priority Data

Nov. 29, 1996 (DE) .............................................. 196 50 833

(51) Int. Cl.$^7$ ................ H04B 1/56; H04L 5/14

(52) U.S. Cl. .................... 370/516; 370/276; 370/284

(58) Field of Search .......................... 370/241, 252, 370/280, 281, 282, 283, 284, 286, 287, 288, 293, 294, 295, 276; 375/225, 226

(56) References Cited

U.S. PATENT DOCUMENTS

| 4,320,516 | * | 3/1982 | Kammerlander | 375/225 |
| 4,819,080 | * | 4/1989 | Cucchietti et al. | 375/226 |
| 5,923,706 | * | 7/1999 | Marz | 375/226 |
| 5,936,946 | * | 8/1999 | Hoffmann | 370/276 |

* cited by examiner

Primary Examiner—Chi H. Pham
Assistant Examiner—Frank Duong
(74) Attorney, Agent, or Firm—Thomas F. Lenihan; Francis I. Gray

(57) ABSTRACT

A measuring device for the interface of a transmission link with full-duplex transmission in two-wire common band operation includes a device for simulating the interface that allows the signal in the near-to-far direction on the transmission link to be separated from the return signal. To precisely perform jitter measurements on the interface of the transmission link during ongoing transmission using a conventional jitter measuring instrument, the measuring device has a differentiator followed by a comparator connected between a subtractor and the jitter measuring instrument.

4 Claims, 2 Drawing Sheets

MEASURING DEVICE FOR THE INTERFACE OF A TRANSMISSION LINK WITH FULL-DUPLEX TRANSMISSION IN TWO-WIRE COMMON BAND OPERATION

BACKGROUND OF THE INVENTION

The present invention relates to transmission link testing, and more particularly to a measuring device for the interface of a transmission link with full-duplex transmission in two-wire common band operation.

It is known (for example from U.S. Pat. No. 4,989,202) that an ISDN (Integrated Services Digital Network) transmission link has a U interface between the transmission line and a so called network. It is further known (cf. "Siemens-KMT-Report, No. 14, order no. E 80001-V331-W54, pages 6 and 7) to perform measurements on this U interface and to provide a corresponding measuring device for this purpose. This measuring device may be used to perform frequency-dependent measurements, functional tests as well as jitter measurements for example. An ISDN transmission link is a special form of a transmission link with full-duplex transmission in two-wire common band operation.

Furthermore, German patent specification DE 44 23 333 C1 discloses a measuring device for the interface of a transmission link with full-duplex transmission in two-wire common band operation. Connected to said interface are a large-scale integrated interface module, via a hybrid circuit and a transformer, on the one hand, and a line termination or a network termination as the test object on the other hand. The measuring device includes means simulating the arrangement of hybrid circuit, transformer and line or network termination, the input of said simulating means being connected to the transmission outputs of the interface module via a high-impedance differential amplifier and the output of said simulating means being connected to an input of a subtractor via a further high-impedance differential amplifier. A further input of the subtractor is connected to said interface via an additional high-impedance differential amplifier; the output of the subtractor communicates with a measuring system.

The invention is based on a measuring device of this type and it is the object of the invention to permit jitter measurements to be precisely performed on the interface of a transmission link with full-duplex transmission during the ongoing transmission using a conventional jitter measuring device.

BRIEF SUMMARY OF THE INVENTION

For accomplishing this object, the invention proposes a measuring device in which a differentiator followed by a comparator is coupled to the subtractor and a jitter measuring device as a measuring system is post-connected to the comparator.

The essential advantage of the measuring device according to the invention is that it also permits an unambiguous determination of phase jitter in the case of ISDN data signals with multivalid codes since the differentiator and the comparator post-connected to it only detect relevant data signals; such being characterized in that they feature the full signal level swing predetermined by the respective code whereas all other data signals are ignored during phase jitter measurement.

In order to realize a specially simple differentiator which may also be produced at low cost, it is considered advantageous to form said differentiator from a series connection of at least one capacitor, at least one inductor and at least one resistor.

The differentiated output of the differentiator may be transmitted to the comparator in a particularly simple and thus advantageous manner if a voltage dropping at the resistor is applied to the comparator.

Differentiators which are simple from a point of view of circuit engineering are bandpass filters for example for which reason it is considered advantageous if the differentiator is a bandpass filter. A further advantage of a bandpass filter is that low-frequency interference signals, e.g. caused by the interface, are suppressed by the bandpass filter so as not to affect the jitter measurements.

The invention is illustrated in more detail in the accompanying drawings.

DETAILED DESCRIPTION OF THE INVENTION

Figure 1:
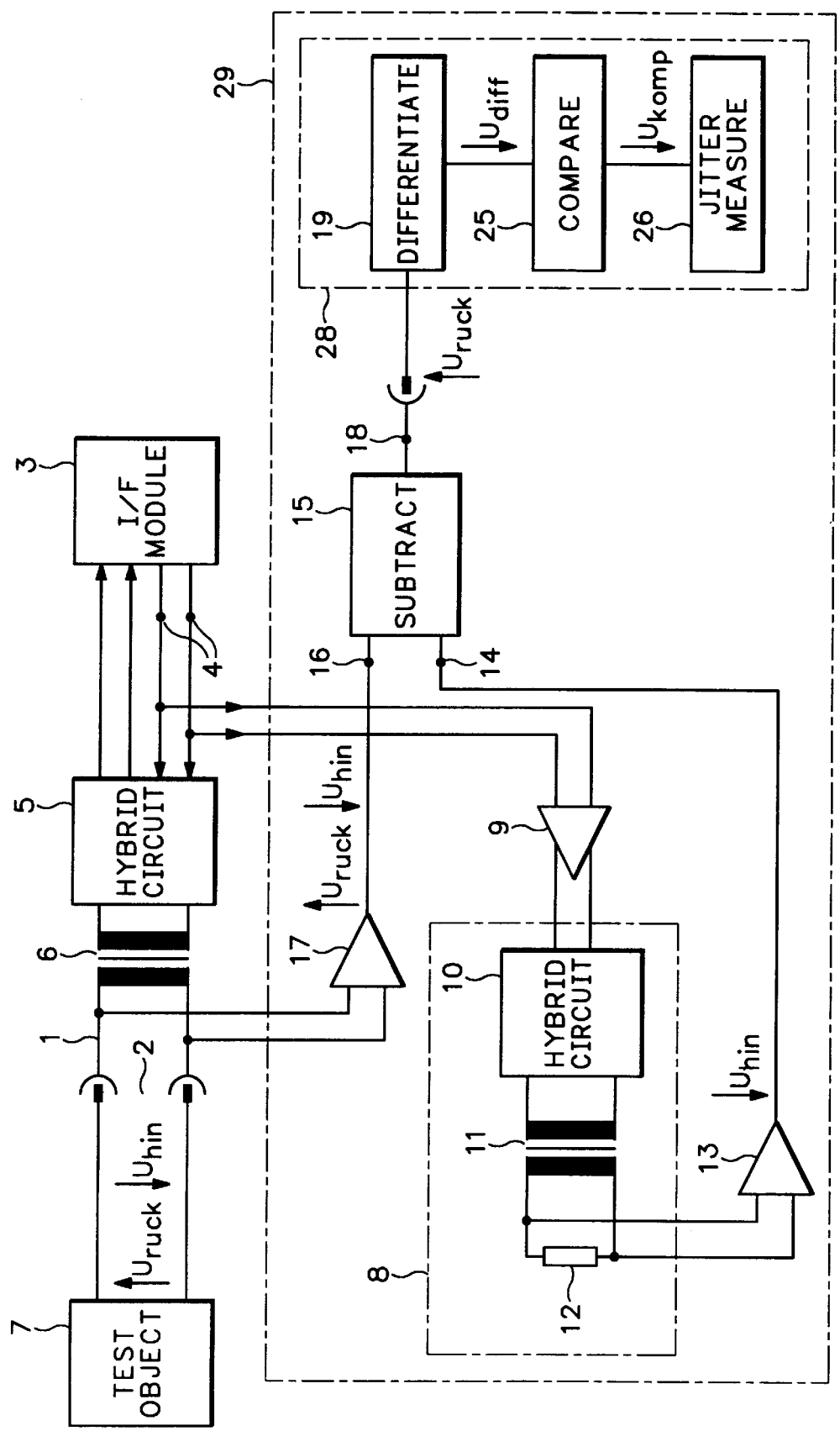
FIG. 1 is a view of an embodiment of the measuring device according to the invention.

FIG. 1 first of all shows a transmission link 1 with an interface 2 which may be a U interface of an ISDN transmission link as a special form of a transmission link with full-duplex transmission in two-wire common band operation. Coupled to said U interface in a known manner is a large-scale integrated interface module 3. In more detail, said large-scale integrated interface module 3 is connected to a hybrid circuit 5 via two transmission outputs 4; said hybrid circuit 5 is connected to said interface 2 via a post-connected transformer 6, with a test object 7 being in turn connected to said interface 2. This test object 7 may be a line termination or a network termination.

As is further shown in FIG. 1, a simulating means 8 is connected to the transmission outputs 4 of the large-scale integrated interface module 3 via a high-impedance differential amplifier 9. Connected to the input of this simulating means 8 is a hybrid circuit 10, the electrical characteristics of which are identical with those of the hybrid circuit 5 of the transmission link 1. A transformer 11 post-connected to the identical hybrid circuit 10 is likewise identical with the transformer 6 of the transmission link 1. Connected to the identical transformer 11 is a termination 12 whose electrical characteristics are identical with those of the test object 7. The hybrid circuit 10, the transformer 11 and the termination 12 form the simulating means 8. Connected to the input of the identical termination 12 is a further high-impedance differential amplifier 13 the output of which is connected to an input 14 of a subtractor 15.

A further input 16 of the subtractor 15 is connected to the interface 2 via an additional high-impedance differential amplifier 17. Connected to an output 18 of the subtractor 15 is a differentiator 19 to which a comparator 25 is post-connected. The output of the comparator 25 in turn is connected to a jitter measuring device 26. The differentiator 19, the comparator 25 and the jitter measuring device 26 together form a jitter measuring system 28. Said jitter measuring system 28, said subtractor 15, said simulating means 8 and said differential amplifiers 9, 13 and 17 together form a measuring device 29 which is connected to the interface 2 on the one hand and to the transmission outputs 4 of the interface module 3, on the other hand.

In FIG. 1, an arrow marked "$U_{hin}$" adjacent the interface 2 denotes the fact that a signal is applied to the interface 2 and thus also to the input of the additional high-impedance differential amplifier 17 which signal is transmitted by the large-scale integrated interface module 3 to the test object 7 via the hybrid circuit 5 and the transformer 6. Furthermore, the signal $U_{rück}$ is applied to the interface 2, which signal is emitted by the test object 7. As a consequence, since the amplifier 17 has an amplification factor of 1, both signals $U_{hin}$ and $U_{rück}$ are present at the output of the additional differential amplifier 17 and are detected by the subtractor 15 via input 16. However, only the signal $U_{hin}$ output by the transmission outputs 4 of the large-scale integrated interface module 3 is applied to the input 14 of the subtractor 15 via the differential amplifier 9, the identical hybrid circuit 10, the identical transformer 11 and the further high-impedance amplifier 13. Owing to subtraction, therefore, only the signal $U_{rück}$ appears at the output 18 of the subtractor 15, which signal contains information from and about the test object 7 and can thus be examined in the jitter measuring system 28, e.g. for phase jitter. As a consequence, the signal $U_{hin}$ does not interfere with jitter measurement.

The signal $U_{rück}$ present at the output 18 of the subtractor 15 is transmitted to the differentiator 19 which may for example comprise a bandpass filter consisting of a capacitor, an inductor and a resistor. The differentiator 19 differentiates the signal $U_{rück}$ present at the input to form a differentiated signal $U_{diff}$. The differentiated signal $U_{diff}$ is passed on to the comparator 25. The comparator 25 generates a voltage $U_{komp}$ which will always have a value above zero when the voltage of the differentiated signal $U_{diff}$ exceeds a voltage threshold value determined in the comparator 25. The voltage $U_{komp}$ is transmitted to the jitter measuring device 26 which may be of the type described in the document "Telekom-Praxis, Fernmelde-Praxis" (15-16, 15.08.90, ISSN 0015-0118, pages 676–691). The measuring device according to the invention also permits the unambiguous determination of phase jitter in ISDN data signals with multivalid codes since if the comparator 25 has a correspondingly high threshold value only those data signals will be detected which feature the full signal level swing. All other data signals will be ignored during phase jitter measurement.

Figure 2:
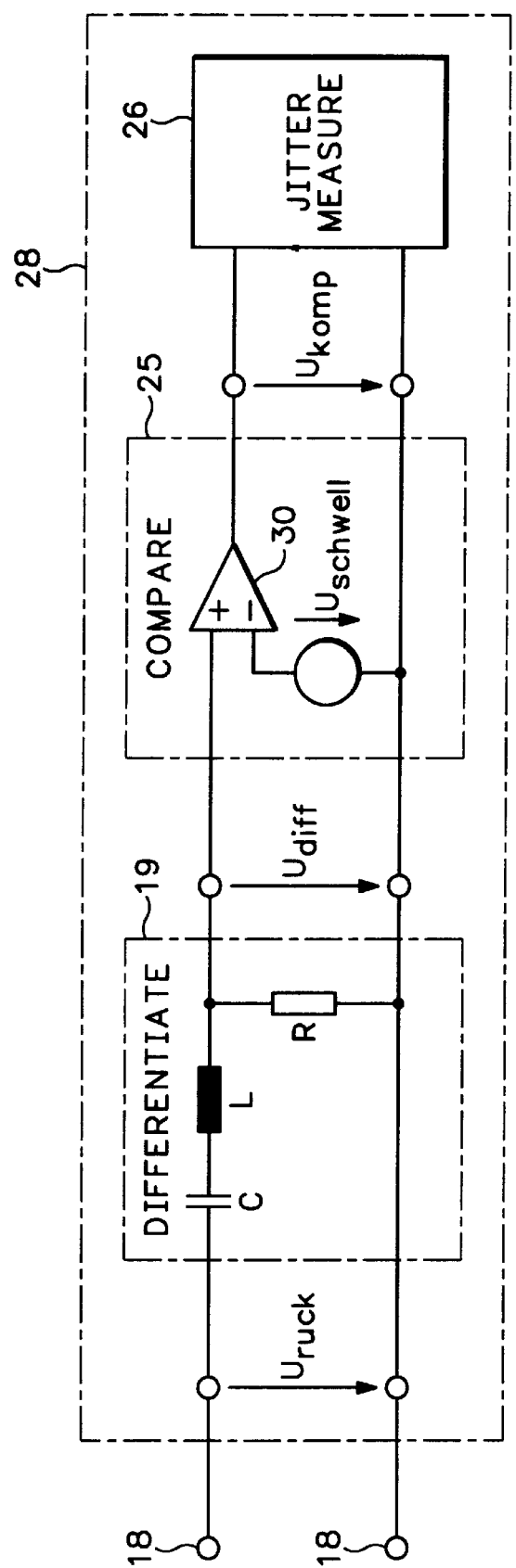
FIG. 2 is a detailed view of a part of the measuring device according to the invention as shown in FIG. 1.

FIG. 2 shows a portion of the arrangement according to the invention as illustrated in FIG. 1. It is to be noted here that all elements of FIG. 2 which have already been explained with reference to FIG. 1 bear the same reference symbols as in FIG. 1. The signal $U_{rück}$ is present at the differentiator 19 which is composed of a bandpass filter with a capacitor C, an inductor L and a resistor R. The voltage $U_{diff}$ dropping at the resistor R is input to the comparator 25 which is formed by an operational amplifier 30 to which a threshold voltage $U_{schwell}$ is input. At the output of said comparator 25 the voltage $U_{komp}$ is formed which is transmitted to the jitter measuring device 26.

The differentiated signal $U_{diff}$ formed at the output of the differentiator 19 as a function of the signal $U_{rück}$ present at the input of the differentiator 19 has the following characteristics:

In the case of a signal transition of the signal $U_{rück}$ with a large signal level swing a high signal value is formed for the differentiated signal $U_{diff}$ whereas in the case of a signal transition of the signal $U_{rück}$ with a small signal level swing only a small signal value is obtained for the differentiated signal $U_{diff}$.

If the signal $U_{rück}$ is constant, the differentiated signal $U_{diff}$ at the output of the differentiator 19 will have a zero voltage value.

As ensues from the above, the magnitude of the signal value of the differentiated signal $U_{diff}$ is a direct function of the signal level swing of the signal $U_{rück}$ during the signal transition. The higher the signal level swing of the signal $U_{rück}$ is, the higher will be the signal value obtained for the differentiated signal $U_{diff}$. The comparator 25, i.e. the operational amplifier 30, compares the differentiated signal $U_{diff}$ with a threshold voltage $U_{schwell}$ applied to the operational amplifier 30. If the signal value of the differentiated signal $U_{diff}$ exceeds the threshold voltage $U_{schwell}$, then a voltage $U_{komp}$ in excess of zero will be output by the output of the operational amplifier 30. However, if the signal value of the differentiated signal $U_{diff}$ is below the value of the threshold voltage $U_{schwell}$, an output voltage value $U_{komp}$ equal to zero will be obtained at the output of the comparator 25. The threshold voltage $U_{schwell}$ may for example be chosen such that the voltage $U_{komp}$ will always have an output voltage value above zero when the signal $U_{rück}$ has a signal transition featuring the full signal level swing. The signal $U_{komp}$ thus only contains the jitter information of the signal $U_{rück}$ with regard to the signal transitions featuring the full signal level swing. Consequently, the jitter measuring device 26 will only evaluate and measure the signal transitions of the signal $U_{rück}$ which feature the full signal level swing. For the sake of completeness, it is noted here that the comparator 25 may also be designed such that signal transitions having other signal level swings than the full one are used for measuring jitter. This is possible e.g. by the use of at least one further operational amplifier to which a further threshold voltage is applied.

What is claimed is:

1. A measuring device (29) for the interface (2) of a transmission link (1) with full-duplex transmission in two-wire common band operation, in which an interface module (3) is on the one hand connected to said interface (2) via a hybrid circuit (5) and a transformer (6), and a line termination (LT) or a network termination (NT) is connected thereto as a test object (7), on the other hand, in which the measuring device (29) is of the type that includes means (8) for simulating the arrangement of the hybrid circuit (5), transformer (6) and line or network termination (7), the input of said means (8) being connected to transmission outputs (4) of the interface module (3) via a high-impedance differential amplifier (9) and the output thereof being connected to an input (14) of a subtractor (15) via a further high-impedance differential amplifier (13), a further input (16) of the subtractor (15) being connected to the interface (2) via an additional high-impedance differential amplifier (17), and the output (18) of the subtractor (15) communicates with a measuring system (28) wherein the measuring system (28) comprises:

a differentiator (19) followed by a comparator (25) connected to the output of the subtractor (15), the output from the differentiator being compared with a reference signal in the comparator, and a jitter measuring device (26) is post-connected to the comparator (25).

2. The measuring device of claim 1 wherein the differentiator (19) is formed by a series connection of at least one capacitor (C), at least one inductor (L) and at least one resistor (R).

3. The measuring device of claim 2 wherein a voltage ($U_{diff}$) dropping at the resistor (R) is applied to the comparator (25).

4. The measuring device as recited in claims 1, 2 or 3 wherein the differentiator (19) is a bandpass filter.

* * * * *